(No Model.)

L. RAEZER.
TWO WHEELED VEHICLE.

No. 379,723. Patented Mar. 20, 1888.

WITNESSES.
Edwin F. Yewell,
John Enders Jr.

INVENTOR.
Levi Raezer,
by W. H. Babcock.
Attorney.

UNITED STATES PATENT OFFICE.

LEVI RAEZER, OF WEST EARL, PENNSYLVANIA.

TWO-WHEELED VEHICLE.

SPECIFICATION forming part of Letters Patent No. 379,723, dated March 20, 1888.

Application filed October 18, 1887. Serial No. 252,759. (No model.)

*To all whom it may concern:*

Be it known that I, LEVI RAEZER, of West Earl, in the county of Lancaster and State of Pennsylvania, have invented certain new and useful Improvements in Two-Wheeled Vehicles; and I do hereby declare the following to be a full, clear, and exact description of the invention, such as will enable others skilled in the art to which it appertains to make and use the same.

My invention relates to new and useful improvements in two-wheeled vehicles designed to carry two passengers.

My invention consists partly in a spring attached at the center to the cross-bar between the shafts, and having attached at each end a curved spring, which runs backward and is bolted to the bottom of the front part of the body, and thus this part is supported with an easy springing motion.

My invention further consists in the manner in which the shafts are attached to the vehicle. The end of each shaft has a small bar bolted to it. There is another bar similar in size and shape bolted to the front part of the axle on both sides. Each of these bars has a slot in it, and they are bolted together with bolts and nuts, and by these means the shafts may be raised or lowered, to suit the size of the horse.

My invention will be better understood by reference to the drawings which accompany this specification, in which similar letters refer to similar parts.

Figure 1:
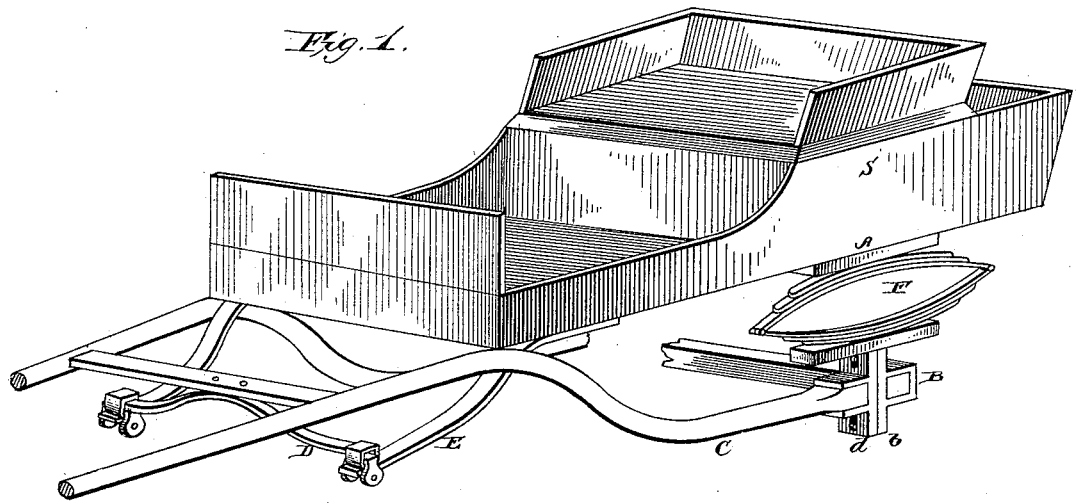
Figure 2:
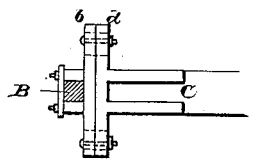
Figure 3:
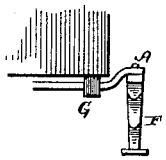
Figure 4:
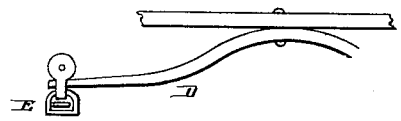
Figure 5:
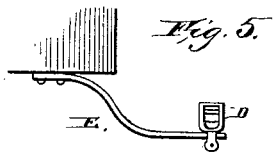

Figure 1 is a perspective view of my invention. Fig. 2 shows the manner of attaching the shafts; Fig. 3, the manner of supporting the body. Fig. 4 shows a portion of the front spring, and Fig. 5 shows one of the curved springs which support the front part of the body.

S is the body.

A is the bar on which the body rests.

F is the elliptical spring on which said bar rests.

C is the shaft, and B the axle; D, the front spring attached to the center of the cross-bar between the shafts; E, one of the curved springs, one end of which is attached to the spring D and the other to the body S.

G is the bearing through which the bar A passes.

*b* is the small bar attached to the axle, and *d* the similar one attached to the shaft.

Having thus described my invention, I claim as new and desire to secure by Letters Patent—

1. In a two-wheeled vehicle, the combination, with the bar A and bearings G, of three springs, as E, D, and E, the first and last being attached to the front of the body and the other to the cross-bar of the shafts, substantially as set forth, and for the purpose described.

2. In a two-wheeled vehicle having the bar A and bearings G and the three springs E D E, as described, the two bars *b* and *d*, one attached to the axle, the other to the ends of the shafts, having similar slots, and being held together by means of bolts through said slots, substantially as set forth, and for the purposes described.

In testimony whereof I have hereunto subscribed my name in the presence of two subscribing witnesses.

LEVI RAEZER.

Witnesses:
 C. G. DENNIS,
 E. BURKHOLDER.